United States Patent

Grosseau

[11] 3,899,051
[45] Aug. 12, 1975

[54] DISC BRAKES ESPECIALLY FOR AUTOMOBILES

[75] Inventor: Albert Grosseau, Chaville, France

[73] Assignee: Societe Anonyme Automobiles Citroen, Paris, France

[22] Filed: Apr. 22, 1974

[21] Appl. No.: 462,923

Related U.S. Application Data

[63] Continuation of Ser. No. 263,689, June 16, 1972, abandoned.

[30] Foreign Application Priority Data

June 17, 1971 France .............................. 71.22043

[52] U.S. Cl. .............................................. 188/73.5
[51] Int. Cl. ........................................... F16d 55/228
[58] Field of Search .............. 188/73.3, 73.5, 205 A, 188/72.3

[56] References Cited

UNITED STATES PATENTS

| 3,391,761 | 7/1968 | Brueder | 188/73.5 |
| 3,450,234 | 6/1969 | Takata | 188/73.3 |
| 3,684,061 | 8/1972 | Ogawa et al. | 188/73.5 |

FOREIGN PATENTS OR APPLICATIONS

| 1,927,459 | 5/1970 | Germany | 188/73.5 |

*Primary Examiner*—George E. A. Halvosa
*Attorney, Agent, or Firm*—Stevens, Davis, Miller & Mosher

[57] ABSTRACT

The disc brake comprises a disc fast to a brake shaft, a fixed brake frame arranged straddling a portion only of the periphery of the disc and two friction element supports held one at each side of the disc on said frame by rigid and removable fixing structure. These two supports can slide on guide surfaces of this frame in a direction substantially parallel to the shaft. Control structure displace, with respect to the frame, each movable friction element support in the direction which tends to grip the disc between the two friction elements. An elastic device is arranged to exert on one at least of the friction element supports a pressure designed to prevent this support from vibrating. The anti-vibration elastic device is also arranged to immobilise, with respect to the frame, the rigid and removable fixing structure, the latter structure being positively prevented from moving by the elastic device in a direction substantially perpendicular to the pressure exerted by the latter device.

1 Claim, 4 Drawing Figures

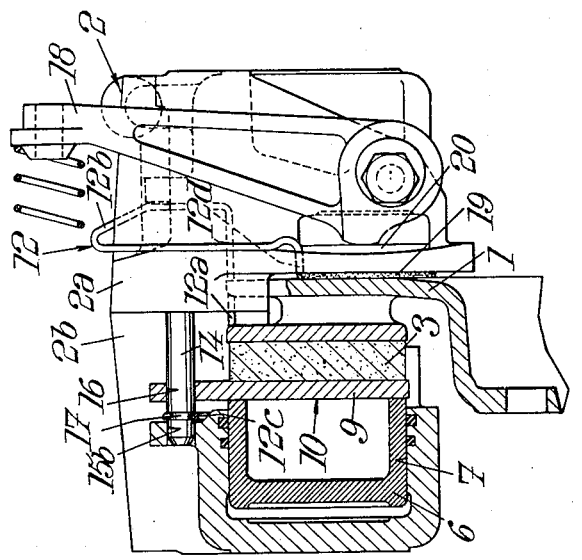

DISC BRAKES ESPECIALLY FOR AUTOMOBILES

This is a continuation of application Ser. No. 263,689, filed June 16, 1972, now abandoned.

The invention relates to disc brakes, especially for automobile vehicles, of the type which comprise a disc rotated by a shaft to be braked, a stationary brake frame arranged straddling only a portion of the periphery of the disc, two friction element supports held one at each side of the disc on said frame by means of rigid and removable fixing means so that one at least of these supports can slide on guide surfaces of the frame in a direction substantially parallel to said shaft, control means adapted to displace with respect to the frame (the or) each movable friction element support in the direction which tends to grip the disc between the two friction elements, and an elastic device adapted to exert on at least one of the friction element supports a pressure for preventing this element from vibrating. The invention relates more particularly to brakes in which the disc is fixed perpendicular to and the frame is fixed parallel to, said shaft and the friction elements are both movable and actuated separately by said control means.

It is a particular object of the invention to provide disc brakes of the type concerned which are of simple and light construction.

It is another object of the invention to provide disc brakes whose friction elements can be easily dismounted and remounted without risk of the brake parts being mislaid by the assembler.

Other objects and advantages of the disc brake according to the invention will emerge from the more detailed description which follows.

The disc brake according to the invention is characterised by the fact that the anti-vibration elastic device is arranged, in addition, to immobilise, with respect to the frame, the rigid and removable fixing means, the latter being positively prevented from moving by said elastic device in a direction substantially perpendicular to the pressure exerted by the latter.

In order that the invention may be more fully understood, a preferred embodiment of a disc brake according to the invention is described below purely by way of illustrative but non-limiting example, with reference to the accompanying drawings, in which:

FIGS. 1 and 2 show partially a disc brake constructed according to the invention, seen respectively from the front and in profile with a section along the line II—II, of FIG. 1.

Figure 3:
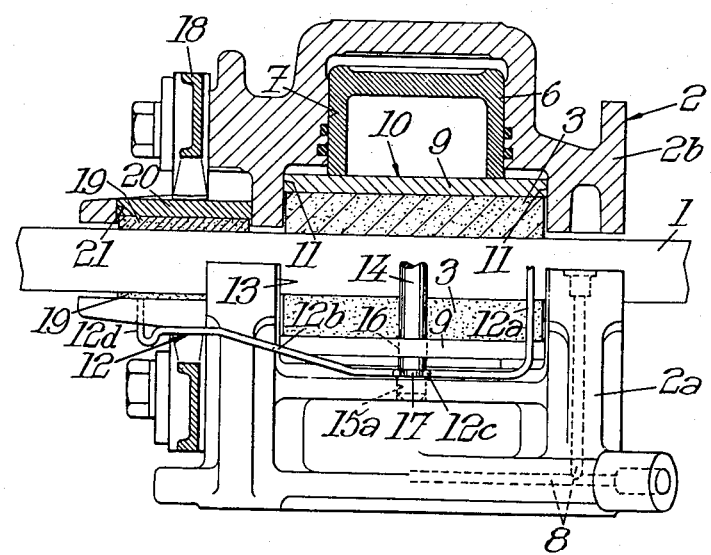
FIG. 3 shows this embodiment seen in plan view with a partial horizontal section.

As regards first of all, the brake as a whole, it is constructed in any suitable manner so that it comprises:
 a disc 1 rotated by a shaft (not shown) to be braked;
 a stationary brake frame 2 arranged straddling a portion only of the periphery of the disc 1;
 two friction linings 3 mounted one at each side of the disc 1 on frame 2 so that one of them at least can slide on this frame parallel to the shaft of the disc 1;
 and control means adapted to move the or each movable lining 3 with respect to the frame 2 in the direction which tends to grip the disc 1 between the two linings.

It will be assumed in the following that the disc 1 is fixed perpendicular to and the frame 2 is fixed parallel to, the shaft of the disc and that the linings 3 are both movable and actuated separately by the abovesaid means.

The frame 2 can be constituted of two elements 2a and 2b coupled approximately in the middle plane of the disc 1 and assembled between themselves and to a fixed part (not shown) by means of bolts passing into holes 5 which traverse the elements 2a, 2b outside the outline of the disc 1.

To actuate the linings, recourse may be had to hydraulic (or pneumatic) control means constituted by pistons 6 slidable in cylinders 7, the latter being arranged in the frame 2 or connected to the latter and capable of being simultaneously supplied with fluid under pressure. The said hydraulic (or pneumatic) means, which are pressurised through passages 8, can be completed or replaced by mechanical means (not shown).

Each lining 3 is borne by a support or rigid plate 9 and forms with the latter a friction element 10. Each friction element is held on the frame 2 by means of rigid and removable fixing means so that it can slide on guide surfaces 11 of the frame 2 with which the plate 9 concerned is in sliding contact. The guide surfaces 11 are oriented so as to absorb, without creating notable radial reactions on the friction elements 10, the tangential forces to which they are subjected on braking. In other words, the surfaces 11 are circular surfaces with generatrices parallel to the shaft of the disc 1 and oriented in approximately radial manner, and can be made of only two flat surfaces (see FIG. 1) situated one on each side of each friction element 10.

Lastly, the brake comprises an elastic device 12, adapted to exert on one at least of the two friction elements 10 a pressure for preventing this or these elements from vibrating.

This being the case, according to the invention, the anti-vibration elastic device 12 is arranged, in addition, to immobilise, with respect to the frame, the rigid and removable fixing means of the friction elements 10, these fixing means being positively prevented from moving by said elastic device in a direction substantially perpendicular to the pressure exerted by the latter.

In the embodiment shown where the frame of the brake possesses an opening 13 situated and dimensioned so as to enable radial extraction of the friction elements 10, these fixing means are constituted by two spindles or better by a single spindle 14 parallel to the shaft of the disc 1 and adapted to be engaged through two holes 15a and 15b in the elements 2a and 2b of the frame 2 as well as through a hole 16 passing through each plate 9

The elastic device 12 is constituted by a spring adapted to be engaged elastically in a recess formed in the rigid and removable fixing means, and more particularly in the case of the present description, in the spindle 14.

Although such a spring can be arranged on each of the elements of the frame 2a and 2b, it is preferable to have recourse to a single spring approximately symmetrical with respect to the plane of the disc 1 and constituted advantageously by a wire of spring steel (piano wire).

In the embodiment shown, the assembly can be completed by an auxiliary brake with mechanical actuation comprising for example levers such as 18 and adapted to apply against the disc 1 linings such as 19 which are borne by the plates 20 and mounted in sliding manner in cylindrical housings 21 provided respectively in the elements 2a and 2b of the frame 2.

The elastic device 12, and especially the spring of steel wire which constitutes it, can then advantageously be used to exert also on the friction elements 19, 20 of the auxiliary brake a pressure designed to prevent them from vibrating. The steel wire spring comprises a transverse branch 12a, passing through the plane of the disc 1 and thrusts against the two plates 9, and two lateral branches 12b arranged approximately in two planes practically equidistant from the plane of the disc 1 and thrusting through their respective ends 12d on the plates 20, these two lateral branches 12b possessing an intermediate part 12c, preferably curved as shown in FIG. 1, adapted to be engaged in a groove 17 formed in the spindle 14. The lateral branches 12b of the said spring can be terminated by inner bends 12d, extending practically parallel to the shaft of the disc and supported on the portion of the plates 20, so that the bends 12d serve simultaneously for exerting pressure on the friction elements 19, 20 and for ensuring the necessary support for the spring 12, with that of the transverse branch 12a, so that its parts 12c remain engaged elastically in the groove 17. Spring 12 is stressed between its ends 12d, abutting plates 20, and its middle part 12a, abutting plates 9.

In a modification, the ends 12d of the lateral branches 12b can be supported directly on the frame.

There is thus obtained a disc brake whose operation and method of replacement of the linings are as follows.

When the linings 3 are pressed by the pistons 6 against the two surfaces of the disc 1, their plates 9 slide along the spindle 14. The braking reaction is transmitted to one or other of the guide or retaining surfaces 11 according as forward or rearward braking is involved.

When a lining must be dismounted, the pin 14 is pulled, after having disengaged from its grooves 17 the parts 12c of the spring 12, so that it emerges from the hole 16 of the plate 9 associated with the lining 3 to be dismounted. There can then be withdrawn radially through the opening 13 the friction element 10 concerned and then the reverse operations can proceed for the remounting.

An advantage of this mounting is that the spring 12, through its branch 12a holds each friction element under slight transverse pressure with respect to the guide spindle 14 and prevents vibrational movements which can cause rattles. The same spring acts on each plate 20 of the auxiliary brake to prevent vibration of the latter.

As is self-evident, and as emerges already from the foregoing, the invention is in no way limited to those of its types of application, nor to those embodiments of its various parts, which have been more especially indicated; it encompasses, on the contrary, all modifications.

Figure 4:
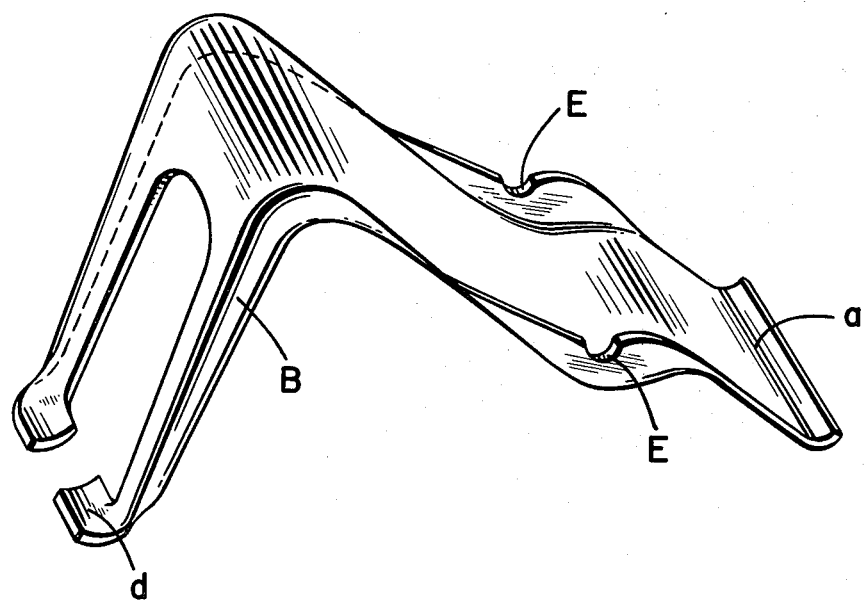
FIG. 4 shows an element of the disc brake in perspective.

For example, a single groove 17, instead of two could be provided on the spindle 14; the spindle 14 could be replaced by a key of non-circular section; the elastic device 12 could be constituted by a strip of sheet steel as shown, for example, in FIG. 4 where the slots E are intended to cooperate with the grooves 17 of the spindle 14, the ends a and d replace respectively ends 12a and 12d, and the folded edges B constitute reinforcing ribs.

I claim:

1. Disc brake, comprising:
   a disc fast to a brake shaft,
   a fixed brake frame arranged straddling a portion only of the periphery of the disc,
   two friction element supports held one at each side of the disc on said frame by means of rigid and removable fixing means comprising at least one spindle whose axis is in a plane parallel to the disc shaft and engaged through at least one hole in the frame so that these two supports can slide on guide surfaces of this frame in a direction substantially parallel to said shaft, said spindle having two recess grooves therein,
   control means adapted to displace, with respect to the frame, each movable friction element support in the direction which tends to grip the disc between the two friction elements,
   an auxiliary brake having friction element supports cooperating with said disc, and
   an antivibration spring steel elastic wire having a branch passing through the plane of the disc and supported on the friction element supports and two lateral branches arranged approximately in two planes practically equidistant from the plane of the disc with the respective ends of said lateral branches in contact with the friction element supports of said auxiliary brake, said two lateral branches each possessing an intermediate portion, each adapted to be elastically engaged in one of the recess grooves of said spindle, whereby said friction elements are prevented from vibrating and ensuring the support of the lateral branches of said spring while immobilizing said spindle with respect to the frame in an axial direction.

* * * * *